US006557125B1

(12) United States Patent
Rochat et al.

(10) Patent No.: US 6,557,125 B1
(45) Date of Patent: Apr. 29, 2003

(54) SYSTEM AND METHOD FOR GENERATING A DEFECT MAP FOR A DATA-STORAGE MEDIUM WITHOUT THE USE OF A HARD INDEX

(75) Inventors: Daniel D. Rochat, Ogden, UT (US); Kenneth D. Austin, Perry, UT (US); Eric R. Peters, Roy, UT (US); Robert L. Short, Lafeyette, OH (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/458,649

(22) Filed: Dec. 10, 1999

Related U.S. Application Data

(60) Provisional application No. 60/111,824, filed on Dec. 11, 1998.

(51) Int. Cl.$^7$ ................................................ G06F 11/00
(52) U.S. Cl. ..................................... 714/704; 369/47.14
(58) Field of Search ................................ 714/704, 710; 369/47.14, 53.15, 53.16, 53.17, 53.31, 53.35, 58; 360/51

(56) References Cited

U.S. PATENT DOCUMENTS 5,212,677 A * 5/1993 Shimote et al. ............... 369/58
5,812,335 A * 9/1998 Kool et al. .................... 360/51
5,812,755 A * 9/1998 Kool et al. .................... 360/51

* cited by examiner

Primary Examiner—Phung M. Chung
(74) Attorney, Agent, or Firm—Woodcock Washburn LLP

(57) ABSTRACT

A defect map for a data-storage medium is generated without the use of a hard index on the medium. The servo sectors normally written to the medium during formatting operations are utilized to identify the angular positions of defective data sectors. The track-location data typically stored in each data sector is used to identify the radial positions of defective sectors. This positional information is processed by a set of computer-executable instructions that generate a graphical representation of the data-storage medium. Symbols are placed on the graphical representation in positions corresponding to the locations on the medium at which defective data sectors are identified.

23 Claims, 6 Drawing Sheets

SYSTEM AND METHOD FOR GENERATING A DEFECT MAP FOR A DATA-STORAGE MEDIUM WITHOUT THE USE OF A HARD INDEX

This application claims priority under 35 U.S.C. §119(e) to U.S. Provisional Patent Application Ser. No. 60/111,824, which was filed on Dec. 11, 1998 and is hereby incorporated by reference in its entirety.

BACKGROUND OF THE INVENTION

Data-storage media typically store digital information in discrete locations known as data sectors. The ability of the data sectors of a particular data-storage medium to properly store information is usually checked at some point before the medium reaches the end user. This check is commonly known as a verification. An excessive amount of defective sectors on a data-storage medium may necessitate scrapping the medium. Alternatively, the medium may be utilized after steps have been taken to avoid any future use of the defective sectors.

The relative positions of each defective data sector are sometimes needed by the manufacturer of the data-storage medium in order to identify, diagnose, and correct systemic problems in the production process. For example, several defective sectors oriented along a substantially straight line may be indicative of a manufacturing problem that is placing a scratch on the medium. Hence, manufacturers utilize so-called defect maps that illustrate the positional relationship among defective data sectors. More specifically, a defect map is a graphical representation of the surface of the medium. Symbols are placed on the representation in positions corresponding the locations on the medium at which defective data sectors are located.

Each data sector typically contains specific information that identifies that particular sector. The identities of defective sectors are typically documented by recording this information during the verification process. The sector-identification information alone, however, cannot be utilized to determine the relative positions of the defective sectors. In general, some type of index must be imposed on the surface of the data-storage medium in order to determine these positional relationships. The index furnishes a common reference frame to which the locations of the defective sectors can be related. This type of index is commonly referred to as a hard index.

The use of a hard index presents a number of disadvantages. For example, a hard index consumes data-storage space, thereby reducing the amount of data-storage space available to the user of the data-storage medium. Furthermore, a hard index adds complexity to the medium's data-storage architecture, and increases the number of steps in the production process for the medium.

Hence, eliminating the need for a hard index to map defects on data-storage media offers potential advantages relating increased data-storage capacity and reduced production costs. The present invention is directed to these and other goals.

SUMMARY OF THE INVENTION

An object of the present invention is to provide a method for generating a defect map for a data-storage medium without the use of a hard index. In accordance with this object, a presently-preferred method for generating a defect map for a data-storage medium comprises the step of identifying a defective data sector positioned along a data track on a surface of the data-storage medium. The method also comprises the steps of writing predetermined identification data to the defective data sector, and reading track-location data and the predetermined identification data from the defective data sector.

The presently-preferred method further comprises the steps of reading data from servo sectors positioned along the data track, and updating a count each time the data from one of the servo sectors is read. The method also includes the step of determining a position of the defective data sector on the surface of the data-storage medium based on a value of the count when the identification data from the defective data sector is read, and the track-location data from the defective data sector.

Preferably, the method also includes the steps of generating a graphical representation of the surface of the data-storage medium, superimposing a first symbol on the graphical representation in a position on the graphical representation that corresponds to the position of the defective data sector on the surface of the data-storage medium, and displaying the graphical representation and the symbol on an output device.

In further accordance with the above-noted object of the invention, a presently-preferred method for mapping a defective member of a set of data sectors spaced apart by an equal angular interval along a data track on a surface of a data-storage medium comprises the step of identifying the defective member. The method also includes the steps of writing predetermined identification data to the defective member, and reading track-location data and the predetermined identification data from the defective member.

The presently-preferred method further includes the steps of reading data from servo sectors positioned along the data track, and updating a count each time the data from one of the servo sectors is read. The method also comprises the step of determining an angular position of the defective member on the surface of the data-storage medium by multiplying the angular interval by a value of the count when the identification data from the defective member is read. The method further includes the step of determining a radial position of the defective member on the surface of the data-storage medium based on the track-location data.

Preferably, the method further comprises the step of displaying a graphical representation of the surface of the data-storage medium that includes a symbol located in a position on the graphical representation that corresponds to the angular and the radial positions of the defective member on the surface of the data-storage medium.

A further object of the present invention is to provide a system for generating a defect map for a data-storage medium without the use of a hard index. In accordance with this object, a presently-preferred system for generating a defect map for a data-storage medium comprises a microprocessor and a memory-storage device electrically coupled to the microprocessor.

The presently-preferred system also includes a set of computer-executable instructions stored on the memory-storage device. The computer-executable instructions identify a defective data sector positioned along a data track on a surface of the data-storage medium. The computer-executable instructions also write predetermined identification data to the defective data sector, and read track-location data and the predetermined identification data from the defective data sector. The computer-executable instructions also read data from servo sectors positioned along the data track, and update a count each time the data from one of the servo sectors is read. Furthermore, the computer-executable instructions determine a position of the defective data sector on the surface of the data-storage medium based on a value of the count when the identification data from the defective data sector is read, and the track-location data from the defective data sector.

BRIEF DESCRIPTION OF THE DRAWINGS

The foregoing summary, as well as the following detailed description of a presently-preferred embodiment, is better understood when read in conjunction with the appended drawings. For the purposes of illustrating the invention, there is shown in the drawings an embodiment that is presently preferred, it being understood, however, that the invention is not limited to the specific methods and instrumentalities disclosed. In the drawings.

DESCRIPTION OF THE PREFERRED EMBODIMENTS

The present invention provides a system and a method for generating a graphical image, or map, that displays the locations of defective data sectors on a data-storage medium. The invention generates this image without the use of a hard index on the data-storage medium. A presently-preferred embodiment of the invention is described in connection with a particular type of data-storage medium and a particular type of map-generating device. This embodiment is presented for exemplary purposes only. Accordingly, the invention should not be limited to the particular embodiment shown, as the invention can be applied to other types of data-storage media and other types of defect-mapping devices.

Figure 1:
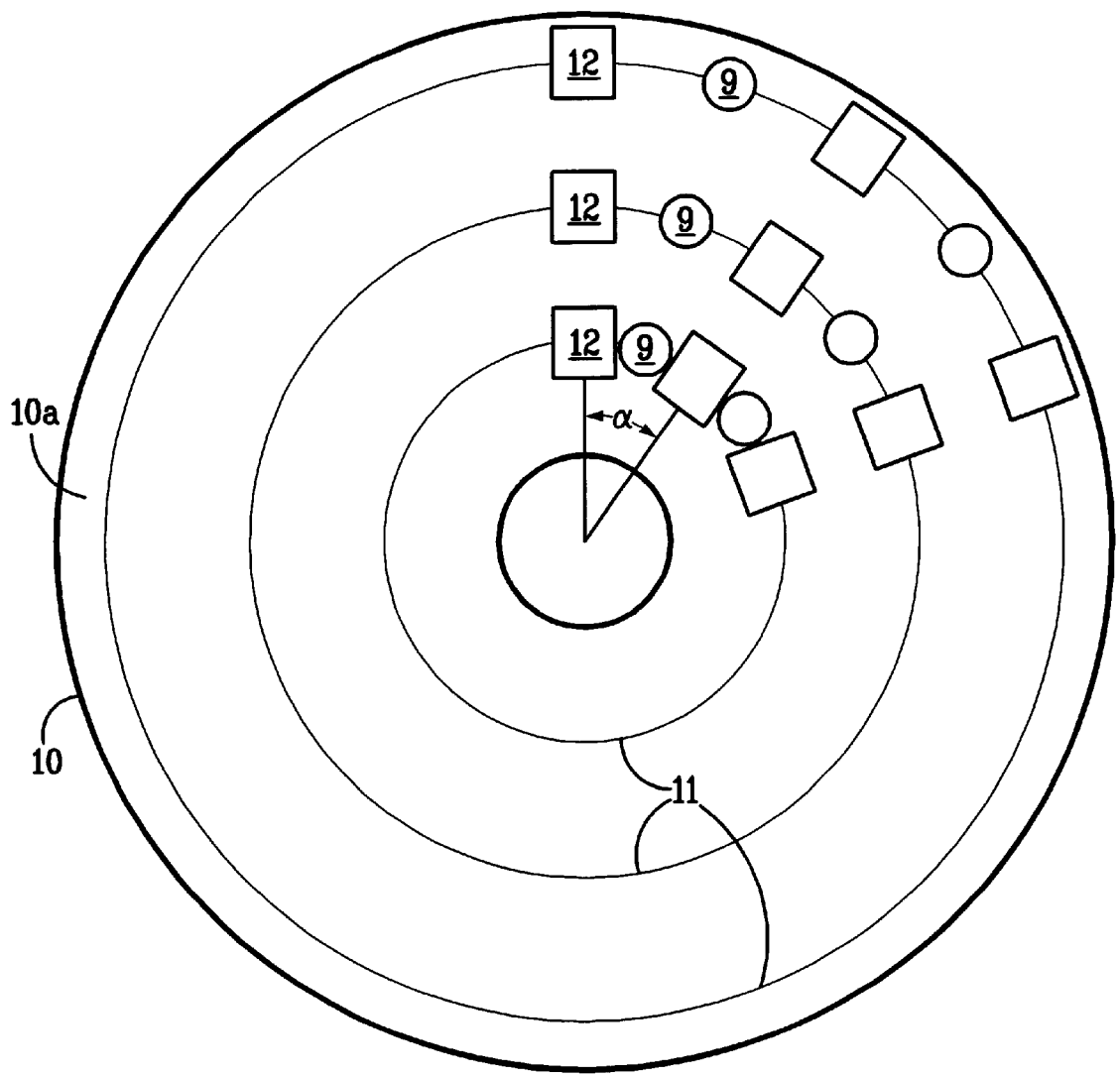
FIG. 1 is a diagrammatic illustration of a data-storage medium that can be used in conjunction with the present invention.

FIG. 1 is a diagrammatic illustration showing an exemplary data-storage medium 10 that can be used in conjunction with the present invention. Medium 10 may be housed within a data-storage cartridge (not shown) during use with a removable-media disk drive. Medium 10 may also be used without a housing when embodied as a CD-ROM, or when installed in a fixed-media drive. Medium 10 is used in conjunction with a disk-drive system (also not shown) to store and retrieve digital information. Medium 10 may be one of several different types, e.g., magnetic or optical floppy media, magnetic or optical hard media.

Data-storage medium 10 must be formatted in order to properly interface with a disk drive. In particular, a number of concentric tracks 11 must be defined over a data-storage surface 10a of medium 10. Tracks 11 are defined by the use of servo sectors 12. Data sectors 9 are disposed between adjacent servo sectors 12. Data sectors 9 are utilized for the storage of user data. (For clarity, tracks 11, servo sectors 12, and data-sectors 9 are not drawn to scale in FIG. 1. Also, two or more servo sectors 12 may be disposed between adjacent data sectors 9, unlike the arrangement shown in FIG. 1.)

A fixed number of servo sectors 12 are disposed in equal angular increments along each track 11 (this angular increment is denoted in FIG. 1 by the symbol "α"). A total of 120 servo sectors 12 are placed along each track 11 on the exemplary data-storage medium 10. Thus, the angle α has a value of three degrees on medium 10.

Servo sectors 12 are utilized by the electronics of a disk drive to provide positional guidance to the read-write head of the drive. More specifically, the disk-drive electronics read positional data from servo sectors 12 as sectors 12 pass the read-write head during data storage and retrieval operations. The electronics utilize this data for positional guidance and, in conjunction with a servo loop controller, maintain the read-write head over (or under) a particular track 11 on data-storage medium 10.

Some types of removable data-storage media, e.g., the cartridge used in the well-known ZIP drive, are formatted in a two-step process. These steps comprise a servo-writing process followed by a check, or verification, of the servo-writing process. The formatting operation can be conducted using the hardware shown in diagrammatical form in FIG. 2.

The servo-writing process is performed by a servo-writer 13. Servo-writer 13 is a finely-calibrated device that places servo sectors 12 at precise intervals along data-storage surface 10a of medium 10. Servo-writer 13 comprises a spindle 14 for suspending and rotating medium 10; a read-write head 15 for writing and reading servo information to and from medium 10; an arm 16 for moving head 15 across surface 10a of medium 10; an actuator 17 for controlling the movement of arm 16; a controller 18 for executing and controlling the servo-writing process; and read-write electronics 19 that transform the electromagnetic signals used by head 15 to and from the digital format utilized by controller 18. Additionally, servo-writer 13 comprises an input device 20, e.g., a keyboard, that serves as an operator interface. Skilled artisans will appreciate that servo-writer 13 can be one of many commercially-available units, e.g., the Phase Metric/Helios MS 5000, appropriately modified to accept a particular type of medium 10.

Figure 2:
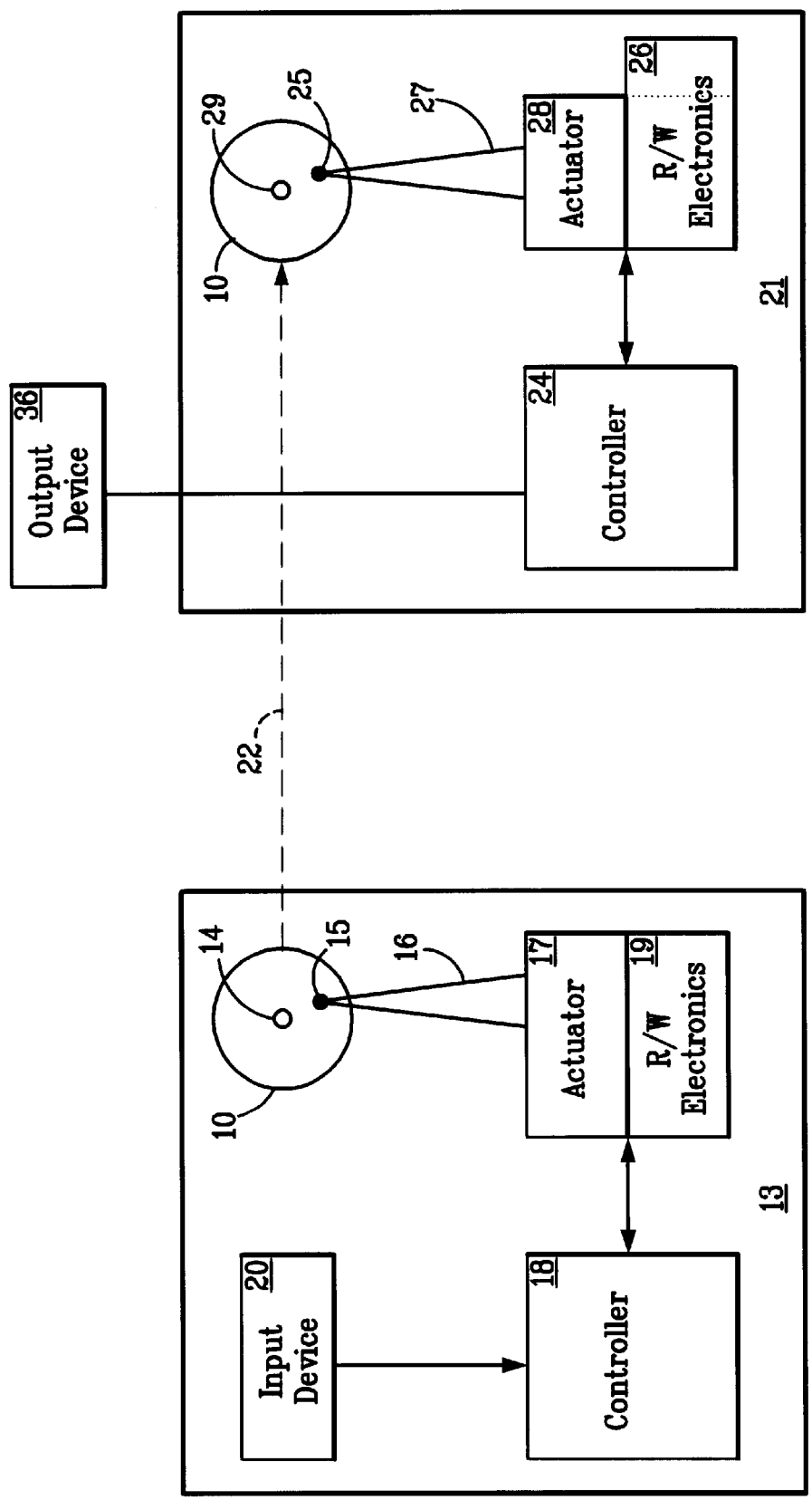
FIG. 2 is a diagrammatic illustration showing a verifier in accordance with the present invention, and a servo-writer.

Data-storage medium 10 is transported to a verifier 21 after completion of the servo-writing process (this step is illustrated by a dashed line 22 in FIG. 2). Verifier 21 performs a check of medium 10 to ensure that medium 10 is able to store data in a proper manner. This check is performed by writing test data to medium 10, reading back the test data, and comparing the as-written data to the as-read data.

Verifier 21 is a data-storage system that is programmed with a set of computer-executable instructions 23 that identify defective data sectors 9. The instructions 23 identify defective data sectors 9 by writing and reading test data to and from medium 10, and comparing the as-written and the as-read data in the above-described manner. Verifier 21 can be a common removable-media disk drive that has been reprogrammed with instructions 23. In the exemplary embodiment, verifier 21 is a standard ZIP disk drive.

Figure 3:
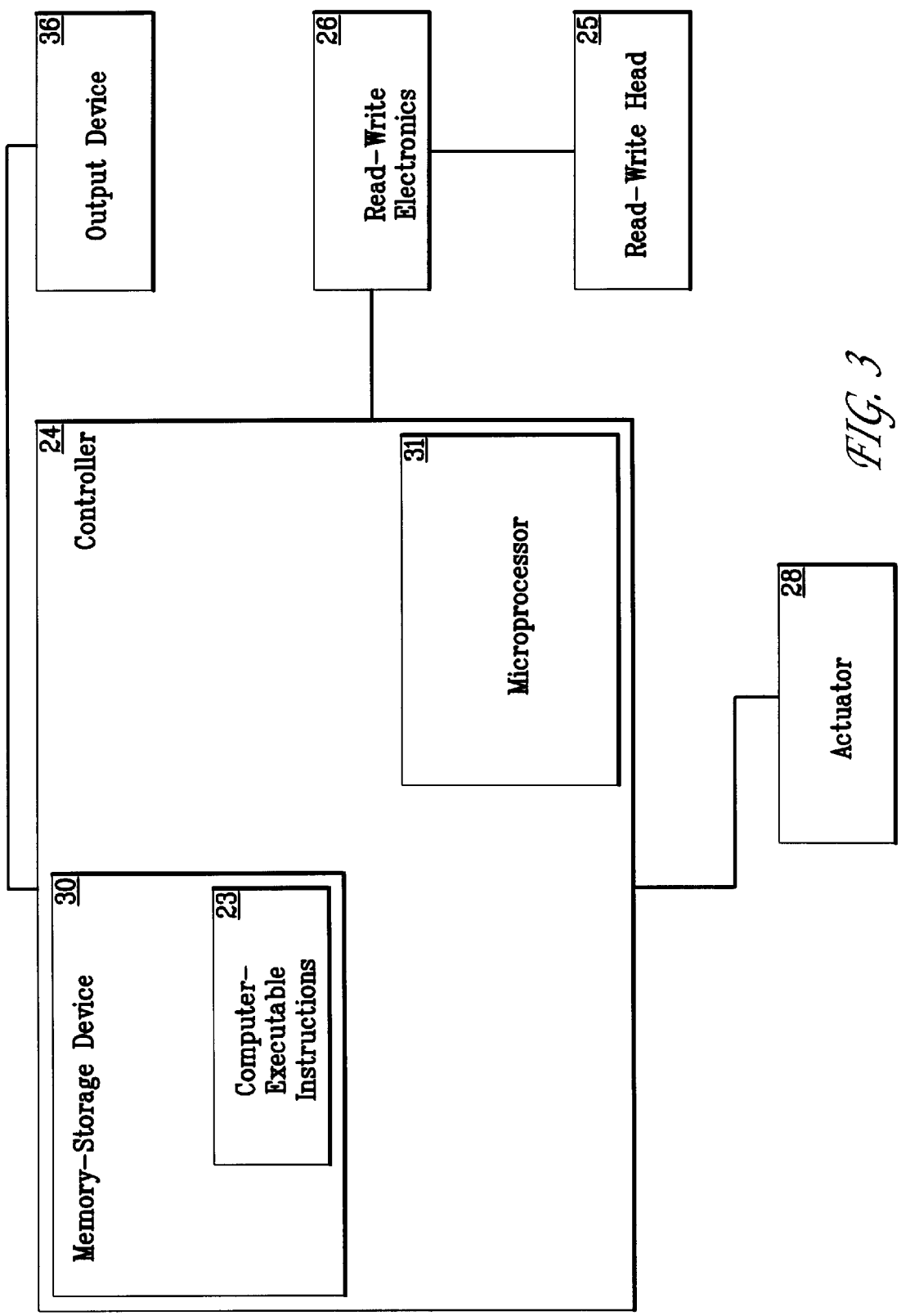
FIG. 3 is a block diagram illustrating the verifier shown in FIG. 2.

The major components of verifier 21 are illustrated diagrammatically in FIG. 2 and in block-diagram form in FIG. 3. Verifier 21 comprises a controller 24 that controls the verification process; a read-write head 25 for writing and reading data to and from medium 10; read/write electronics 26 that transform the electromagnetic signals used by head 25 to and from the digital format utilized by controller 24; an arm 27 for suspending and moving head 25 over the surface of medium 10; an actuator 28 for moving arm 27 in response to commands from controller 24; and a spindle 29 for supporting and rotating medium 10. Controller 24 comprises a memory-storage device 30 upon which instructions 23 are stored (see FIG. 3). Controller 24 also comprises a microprocessor 31 that executes instructions 23.

Figure 4:
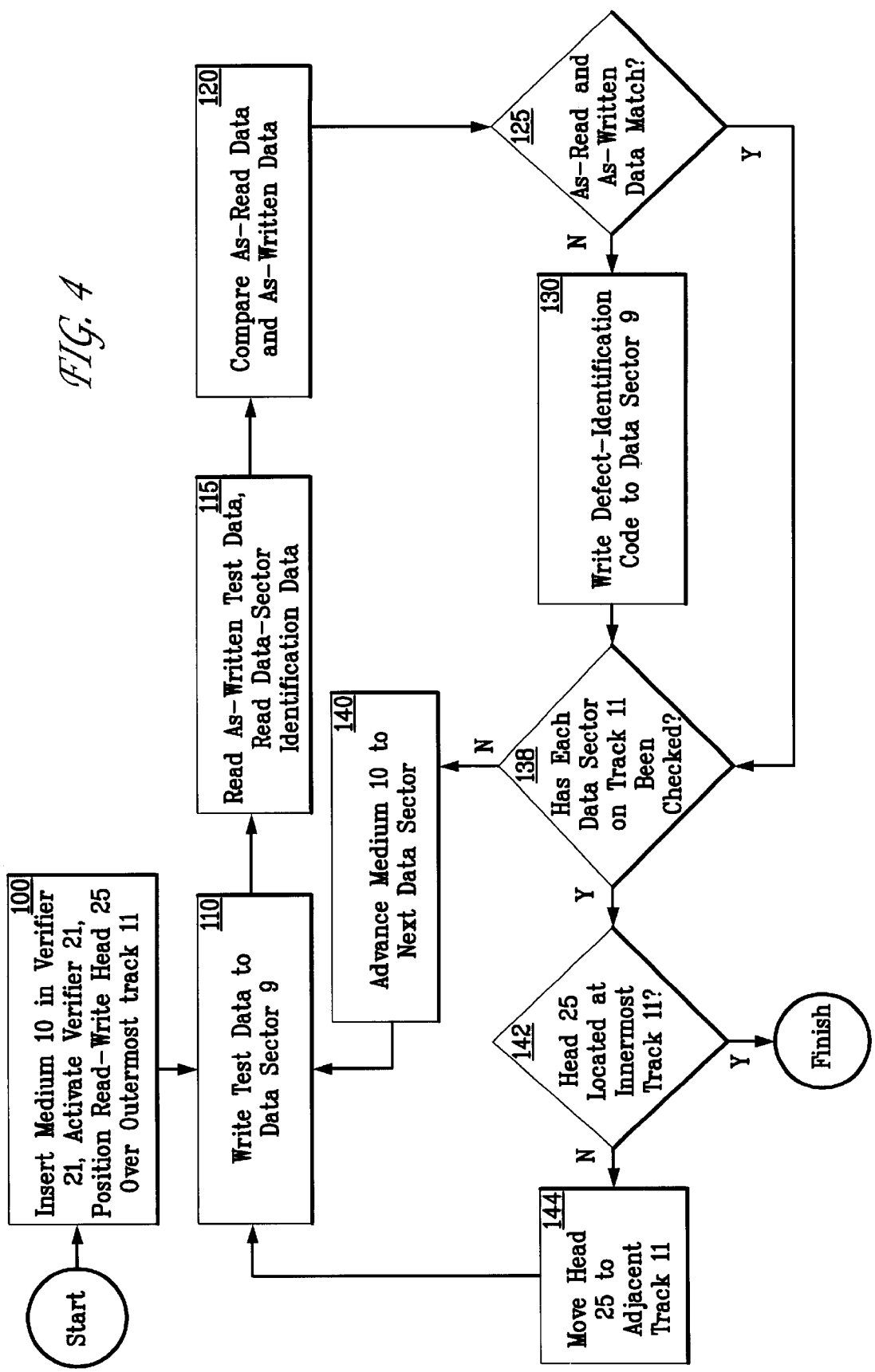
FIG. 4 is a flow diagram showing a verification process in accordance with the present invention.

A verification process that incorporates various aspects of the present invention is illustrated in FIG. 4. The verification process begins with the insertion of medium 10 into verifier 21, followed by activation of the verifier (step 100). Computer-executable instructions 23, by way of microprocessor 31, subsequently position read-write head 25 over an outermost track 11 on medium 10 (step 100).

Verifier 21, as directed by instructions 23, subsequently writes a set of test data to one of data sectors 9 located along track 11 (step 110). Verifier 21 immediately reads back the as-written data (step 115). Verifier 21 also reads the data-sector identification data stored in sector 9 (step 115). Instructions 23 compare the as-written data to the as-read data (step 120). Discrepancies between the as-written and the as-read data are interpreted as an indication that data sector 9 is defective. A checksum may be included in the test data to assist in the identification of such discrepancies.

Upon encountering a discrepancy between the as-written and the as-read data, instructions 23 write a defect-identification code to data sector 9 (steps 125, 130). The defect-identification code may be any unique set of data that can be read and recognized by a data-storage device such as verifier 21. In the exemplary embodiment, the defect-identification code is written to a flag register in data sector 9. The significance of the defect-identification code is explained in detail below.

Medium 10 is subsequently advanced to a position in which an adjacent data sector 9 is positioned directly under (or over) head 25 (step 140). (In practice, medium 10 is constantly rotating, with the noted read-write operations occurring on a substantially instantaneous basis.) A check of the newly-positioned data sector 9 is subsequently performed in the above-described manner (steps 110–130). This process continues until each data sector 9 on track 11 has been checked for defects (step 138). (Computer-executable instructions 23 include logic that tracks the number of data sectors 9 that pass read-write head 25. Instructions 23 compare this number to the total number of data sectors 9 on track 11, and thereby determine when all of the data sectors 9 have been checked.)

Read-write head 25 is advanced to an adjacent data track 11 on medium 10 when each data sector 9 on track 11 has been checked for defects (steps 138, 144). The above-noted process is repeated until all of the data sectors 9 on each data track 11 have been checked for defects, i.e., until the innermost track 11 has been checked for defective sectors 9 (step 142). Hence, each defective data sector 9 includes a defect-identification code is its flag register at the conclusion of the verification process.

Figure 6:
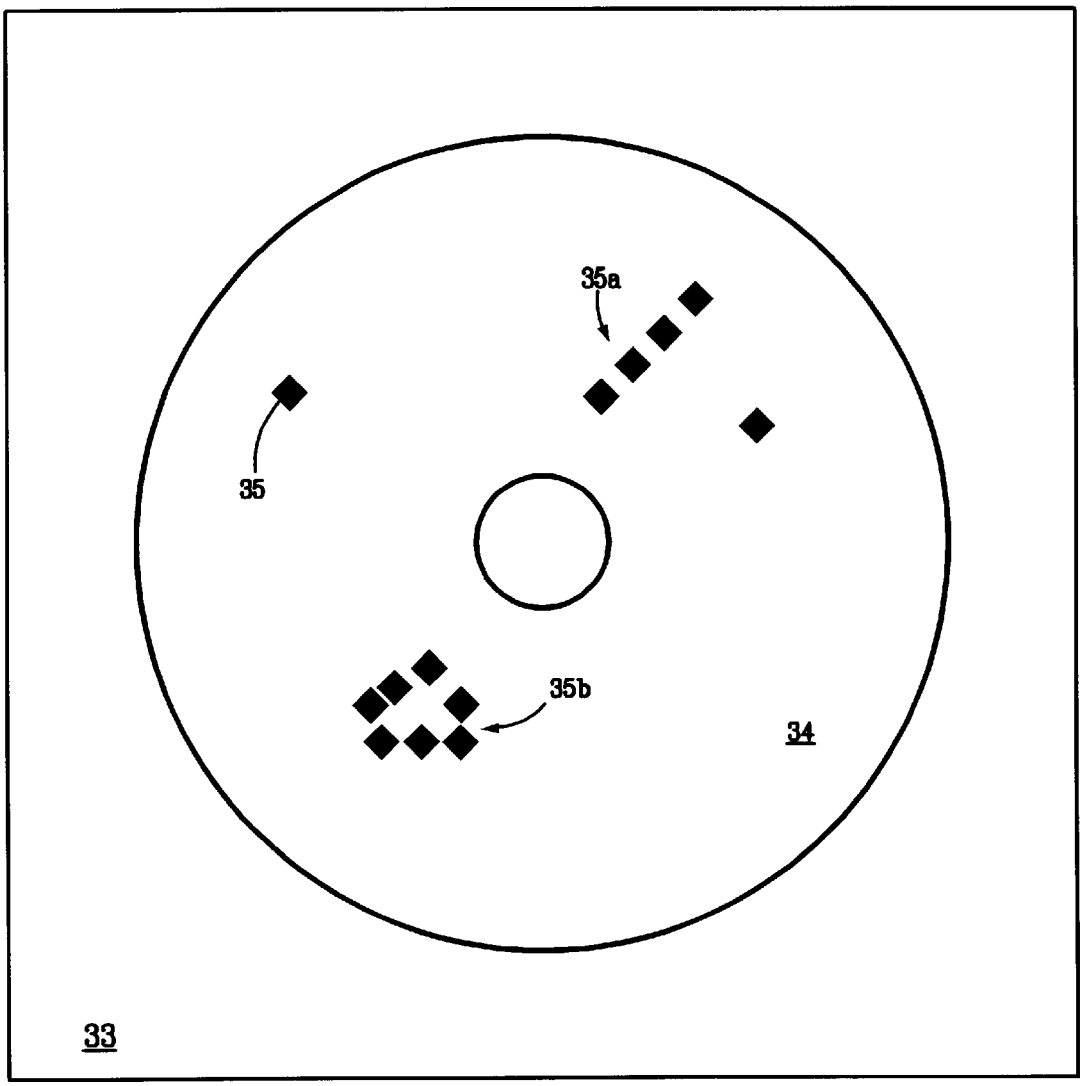
FIG. 6 is a representation of a defect map generated by the process shown in FIG. 5.

A defect map for data-storage medium 10 is generated following the verification process. FIG. 6 illustrates an exemplary defect map 33. In the exemplary embodiment, defect map 33 is generated by verifier 21 and computer-executable instructions 23. Alternative embodiments of the invention may utilize a separate data-storage device and a separate set of computer-executable instructions to generate defect map 33.

Figure 5:
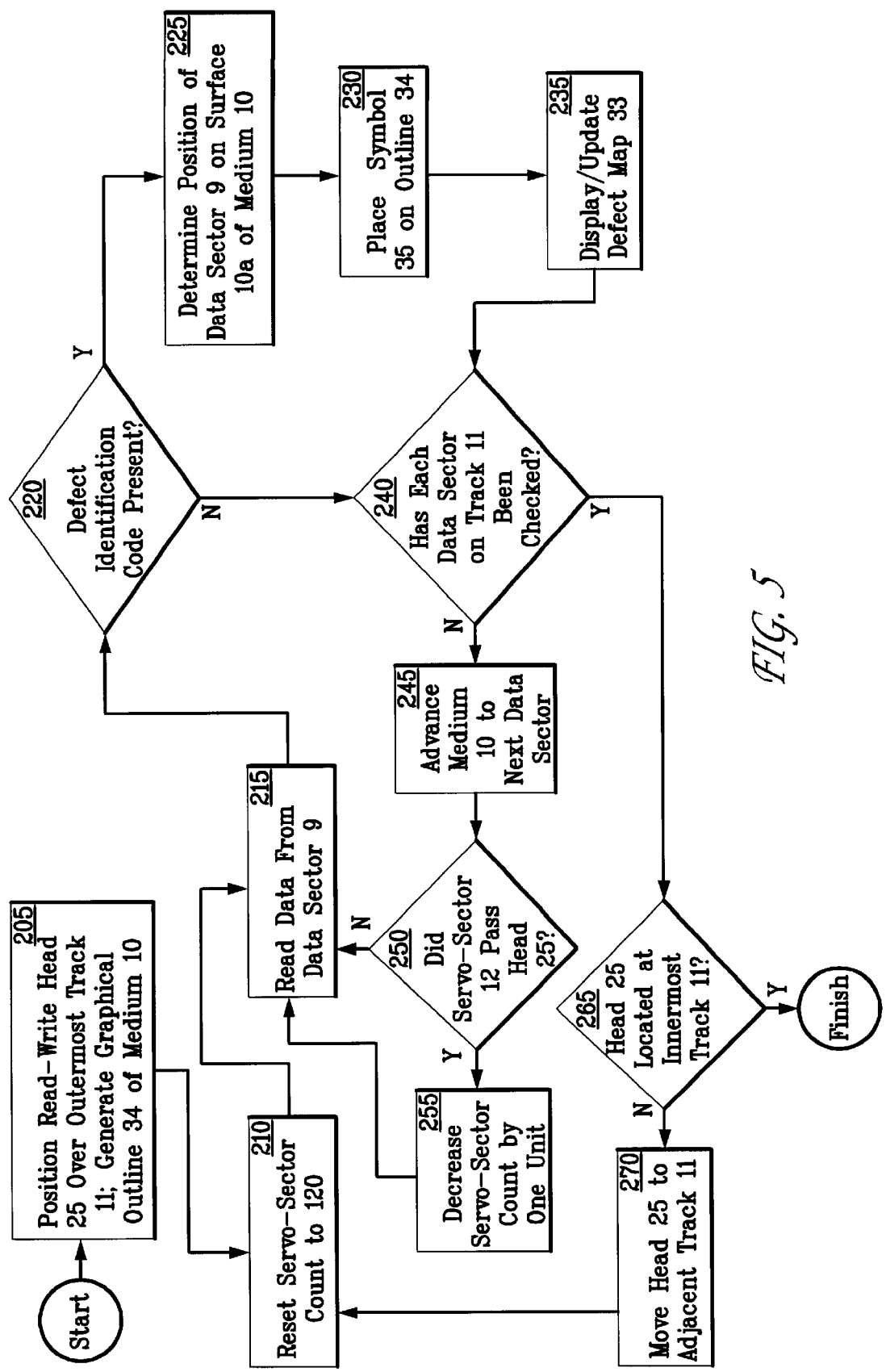
FIG. 5 is a flow diagram showing a method for generating a defect map in accordance with the present invention.

Defect map 33 is generated by the process shown in FIG. 5. (In the exemplary embodiment, this process is performed immediately after the verification process; alternative embodiments of the invention may generate defect map 33 at a time well after the conclusion of the verification process.)

Computer-executable instructions 23 generate a graphical representation of medium 10 (step 205). In particular, instructions 23 generate an outline 34 of data-storage surface 10a (see FIG. 6). Computer-executable instructions 23 also position read-write head 25 over the outermost data track 11 on medium 10, and reset a servo-sector count to 120 (steps 205, 210) (the significance of the servo-sector count is explained in detail below).

Read-write head 25 subsequently reads data from a data sector 9 positioned along the outermost track 11 (step 215). Computer executable instructions 23 check the as-read data for the presence of the defect-identification code (step 220). Upon detecting the presence of the defect-identification code, instructions 23 determine the location on data-storage surface 10a at which the defective data sector 9 is located (step 225). Instructions 23 determine the location of the defective sector 9 based on the current value of the servo-sector count, and the track-location data from the defective data sector 9. (Further details concerning the manner in which instructions 23 determine the location of the defective sector 9 are presented below.)

Computer-executable instructions 23 subsequently place a symbol 35 on outline 34 (step 230). More specifically, instructions 23 place symbol 35 in a position on outline 34 that corresponds to the location on data-storage surface 10a at which the defective data sector 9 is located (see FIG. 6). (Instructions 23 do not place symbol 35 on outline 34 when the defect-identification code is not detected in data sector 9.) Instructions 23 then display outline 34 and symbol 35 on an output device 36 coupled to controller 24. This step generates defect map 33 (step 235).

Medium 10 is subsequently advanced to a position in which an adjacent data sector 9 is positioned directly under (or over) head 25 (step 245). Computer-executable instructions 23 decrease the servo-sector count by one unit if read-write head 25 passes one of the servo sectors 12 before reaching the adjacent data sector 9 (steps 250, 255).

The newly-positioned data sector 9 is checked for the presence of the defect-identification code (steps 215, 220). An additional symbol 35 is added to outline 34, and the display of defect map 33 is updated if the defect-identification code if found to be present (steps 225–235). This process is repeated until each data sector 9 on track 11 has been checked for the presence of the defect-identification code (step 240). (Computer-executable instructions 23, as previously noted, include logic that tracks the number of data sectors 9 that pass read-write head 25. Instructions 23 compare this number to the total number of data sectors 9 on track 11 to determine when all of the data sectors 9 have been checked.)

Computer-executable instructions 23 advance read-write head 25 to an adjacent data track 11 when each data sector 9 along the outermost track 11 has been checked for the presence of the defect-identification code (steps 240, 270). The above-noted process is repeated until all of the data sectors 9 on each data track 11 have been checked for the defect-identification code.

The above noted series of steps produces defect map 33. In particular, defect map 33 is formed by an aggregate display of symbols 35 on outline 34. Hence, map 33 provides a graphical representation that shows the relative locations of defective data sectors 9 on data-storage surface 10a. Map 33 thus facilitates the quick and positive identification of defects such as a scratch 35a or a cluster 35b of defective sectors 9 (see FIG. 6). These types of defect patterns can be indicative of systemic problems in the production process for medium 10. Hence, the timely identification of such defect patterns is of substantial importance. Furthermore, defect map 33 facilitates the use of commonly-known pattern-recognition techniques to identify data sectors 9 that should not be used based on their proximity to defects such as scratch 35a.

Map 33 can be displayed on output device 36 while data-sectors 9 are being checked for the defect-identification code (as in the exemplary embodiment). Alternatively, map 33 may be displayed after the data from all of the sectors 9 has been read and processed (this technique requires storing the data relating to the positions of the defective data sectors 9 in some type of memory-storage device). Output device 36 can comprise any device that is capable of generating a graphical image, e.g., a printer or a video monitor. The image-generating process can be performed by verifier 21 (as in the exemplary embodiment). Alternatively, the image-generating process can be performed by another electronic device programmed with the portion of computer-executable instructions 23 that generate the display of map 33.

Details concerning the manner in which the locations of defective data sectors 9 are determined are as follows. The radial positions of defective data sectors 9 are determined from the sector-location data stored in each data-sector 9. In particular, each sector 9 normally includes data that indicates the particular data track 11 on which that sector 9 is located. In addition, data tracks 11 are concentrically disposed about a center of medium surface 10a. Each track 11 thus occupies a fixed radial position on surface 10a which is unique to that particular track 11. Hence, the radial position of a defective data sector 9 can be determined based on the identity of the particular track 11 on which the defective sector 9 is located.

The angular position of each defective servo sector 9 is determined through the use of the servo sector count. In particular, a fixed number of servo sectors 12 are spaced apart in equal angular intervals along each data track 11 on medium 10, as noted previously. Hence, the passage of each servo sector 12 past read-write head 25 indicates that medium 10 has rotated by a fixed amount in relation to the point at which the preceding servo sector 12 passed head 25 (this value is three degrees for the exemplary medium 10 having 120 servo sectors per track 11). Thus, the value of the servo-sector count provides an indication of the extent to which medium 10 has rotated after the count was set to its initial value. For example, a count value of 70 in the exemplary embodiment indicates that medium 10 has rotated by about 150 degrees after the count was set to its starting value of 120. (This figure represents the number of servo-sectors 12 that have passed head 25 subsequent to the time at which the count was set to its starting value (120−70=50) multiplied by the angular interval corresponding to the passage of each sector (three degrees)).

The extent to which data-storage medium 10 has rotated after the servo-sector count is set to its starting value provides an indication of the relative angular positions of defective data sectors 9 located along the same data track 11. This indication results from the fact that the servo-sector count for data sectors 9 located along the same track 11 is referenced a common starting point.

The extent of the rotation of medium 10 after the count has been set to its starting value also provides an indication of the relative angular positions of defective data sectors 9 located along different data tracks 11. This characteristic is due to the fact that the servo-sector count is reset each time medium 10 completes one full revolution. Hence, the count is reset each time medium 10 reaches a specific angular position while a particular map 33 is being generated. Resetting the count in this manner allows the positions of defective data sectors 9 located along different tacks 11 to be referenced to a common angular position on surface 10a of medium 10.

In addition, computer-executable instructions 23 may comprise additional instructions that cause the servo-sector count to be reset when read-write head 25 passes a specific predetermined data sector 9. This feature allows the locations of defective data sectors 9 to be referenced to an absolute (vs. relative) position on surface 10a. For example, instructions 23 can include a command that resets the servo-sector count when a particular data sector 9 located along the outermost track 11 of medium 10 passes read-write head 25. Thus, the position of a defective data sector 9 can be identified in relation to a fixed, readily-identifiable point on medium 10, i.e., the angular and radial positions of the predetermined data sector 9. Furthermore, this feature provides a common reference point for multiple checks performed on the same medium 10. Referencing a particular data sector 10 in this manner can also be useful in instances when the servo-sector count is interrupted during the map-generating process, e.g., when read-write head 25 is reset.

The present invention provides substantial advantages in relation to systems and methods commonly used to generate defect maps. For example, the invention facilitates the production of a defect map such as map 33 without the use of a hard index on medium 10. This feature eliminates the need to utilize a portion of the overall data-storage capacity of medium 10 to store the data that forms the hard index. Hence, the use of the invention increases the amount of data that can be stored on medium 10 by the user. Furthermore, eliminating the hard index reduces the number of steps needed to produce medium 10, and simplifies the data-storage architecture on medium 10. Hence, the use of the invention can lead to reductions in the cost of medium 10.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A method for generating a defect map for a data-storage medium, comprising the steps of:
    determining an angular position of a defective data sector on the data-storage medium by counting a number of servo sectors on the data-storage medium that pass a predetermined reference point; and
    determining a radial position of the defective data sector based on a location of a data-track on which the defective data sector is positioned.

2. The method of claim 1, further comprising the step of displaying a graphical representation of the data-storage medium having a symbol located in a position on the graphical representation that corresponds to the angular and the radial positions of the defective data sector on the data-storage medium.

3. The method of claim 2, further comprising the step of identifying the defective data sector.

4. The method of claim 3, wherein the step of identifying the defective data sector includes:
    writing data having predetermined characteristics to the defective data sector;
    reading the data written to the defective data sector; and
    comparing the data read from the defective data sector to the data written to the defective data sector.

5. The method of claim 1, wherein the predetermined reference point is a read-write head of a data-storage system.

6. A system for generating a defect map for a data-storage medium, comprising:
 a microprocessor;
 a memory-storage device electrically coupled to the microprocessor; and
 a set of computer-executable instructions stored on the memory-storage device, the computer-executable instructions (i) determining an angular position of a defective data sector on the data-storage medium by counting a number of servo sectors on the data-storage medium that pass a predetermined reference point; and (ii) determining a radial position of the defective data sector based on a location of a data-track on which the defective data sector is positioned.

7. The system of claim 6, wherein the computer-executable instructions generate a graphical representation of the data-storage medium and superimpose a first symbol on the graphical representation in a position on the graphical representation that corresponds to the position of the defective data sector on the data-storage medium.

8. The system of claim 7, further comprising an output device electrically coupled to the microprocessor for displaying the graphical representation.

9. The system of claim 8, further comprising:
 a read-write head electrically coupled to the microprocessor for writing and reading data to and from the data-storage medium;
 a suspension arm mechanically coupled to the read-write head for suspending and moving the read-write head over a surface of the data-storage medium;
 an actuator mechanically coupled to the suspension arm and electrically coupled to the microprocessor for moving the arm in response to commands from the microprocessor; and
 a spindle for supporting and rotating the data-storage medium.

10. The system of claim 9, wherein the predetermined reference point is the read-write head.

11. The system of claim 6, wherein the computer-executable instructions identify the defective data sector.

12. A method for generating a defect map for a data-storage medium, comprising the steps of:
 identifying a defective data sector positioned along a data track on a surface of the data-storage medium;
 writing predetermined identification data to the defective data sector;
 reading track-location data and the predetermined identification data from the defective data sector;
 reading data from servo sectors positioned along the data track;
 updating a count each time the data from one of the servo sectors is read; and
 determining a position of the defective data sector on the surface of the data-storage medium based on (i) a value of the count when the identification data from the defective data sector is read, and (ii) the track-location data from the defective data sector.

13. The method of claim 12, further comprising the steps of:
 generating a graphical representation of the surface of the data-storage medium; and
 superimposing a first symbol on the graphical representation in a position on the graphical representation that corresponds to the position of the defective data sector on the surface of the data-storage medium.

14. The method of claim 13, further comprising the step of displaying the graphical representation and the first symbol on an output device.

15. The method of claim 12, further comprising the steps of:
 identifying a second defective data sector positioned along a second data track on the surface of the data-storage medium;
 writing the predetermined identification data to the second defective data sector;
 reading the track-location data and the predetermined identification data from the second defective data sector;
 reading the data from the servo sectors located along the second of the data tracks;
 updating the count each time the data from the servo sectors located along the second of the data tracks is read; and
 determining a position of the second defective data sector on the surface of the data-storage medium based on (i) the value of the count when the identification data from the second defective data sector is read, and (ii) the track-location data from the second defective data sector.

16. The method of claim 12, wherein the step of identifying a defective data sector positioned along a data track on a surface of the data-storage medium includes:
 writing data having predetermined characteristics to the defective data sector;
 reading the data written to the defective data sector; and
 comparing the data read from the defective data sector to the data written to the defective data sector.

17. The method of claim 12, further comprising the step of setting the value of the count to a predetermined value before the step of reading track-location data and the predetermined identification data from the defective data sector.

18. The method of claim 17, wherein the predetermined value is equal to a total number of the servo sectors positioned along the data track.

19. The method of claim 18, wherein the count is updated by reducing the value of the count by one unit.

20. The method of claim 19, further comprising the step of reading data from a second data track on the surface of the data-storage medium when the value of the count equals zero.

21. The method of claim 20, further comprising the step of setting the count to the predetermined value when the value of the count reaches zero.

22. The method of claim 12, further comprising the steps of:
 reading data from a data sector having a predetermined identity; and
 setting the value of the count to a predetermined value when the data from the data sector having the predetermined identity is read.

23. The method of claim 12, wherein the step of determining the position of the defective data sector on the surface of the data-storage medium includes multiplying an angular spacing interval between a first of the servo sectors and an adjacent second of the servo sectors by the value of the count when the identification data from the defective data sector is read.

* * * * *